United States Patent [19]
Stearns et al.

[11] 3,799,560
[45] Mar. 26, 1974

[54] FIREARM CHAMBER SEAL

[75] Inventors: Burdett K. Stearns, Williston; David A. Graham, Underhill; James M. Seemauo, South Burlington; George Zink, Burlington, all of Vt.

[73] Assignee: General Electric Company, Burlington, Vt.

[22] Filed: Sept. 1, 1972

[21] Appl. No.: 285,598

Related U.S. Application Data
[62] Division of Ser. No. 121,048, March 4, 1971, Pat. No. 3,748,458.

[52] U.S. Cl. .................................. 277/212, 277/81
[51] Int. Cl. ...................... F16j 15/34, F41f 11/00
[58] Field of Search .......... 277/205, 207, 212, 189, 277/189.5, 81.82; 42/59; 89/13, 26, 155, 156, 157

[56] References Cited
UNITED STATES PATENTS
| | | | |
|---|---|---|---|
| 167,981 | 9/1875 | Broadwell | 89/26 |
| 2,998,755 | 9/1961 | Thierry | 89/26 |
| 3,125,928 | 3/1964 | Bartels | 89/26 |
| 2,981,023 | 4/1961 | Sergay | 42/59 |

Primary Examiner—Louis R. Prince
Assistant Examiner—Robert I. Smith
Attorney, Agent, or Firm—Bailin L. Kuch

[57] ABSTRACT

The provision of a lightweight, strong, arched seal with a substantially conical face and a plurality of spring fingers to insure full seating before ignition along the innermost annular junction of the seal with the chamber.

12 Claims, 2 Drawing Figures

PATENTED MAR 26 1974 3,799,560

FIREARM CHAMBER SEAL

This is a division of application Ser. No. 121,048, filed Mar. 4, 1971 and now U.S. Pat. 3,748,498.

BACKGROUND OF THE INVENTION

1. Field of the Invention

This invention relates to means for sealing separable chambers in automatic firearms adapted to fire caseless ammunition.

2. Background of the Invention

A Gatling type gun is disclosed by E. Ashley et al in U.S. Ser. No. 18,099, filed Mar. 10, 1970 and now U.S. Pat. No. 3,706,259 having a plurality of barrels fixed in a rotor, and an endless chain of separable chambers passing around said rotor into and out of alignment with said barrels, and adapted to fire caseless ammunition. It is necessary to seal the aft gap between the forward face of the chamber and the aft faces of the barrels. In Ser. No. 18,099, the aft and forward gaps are shown sealed by L-shaped ring seals such as were used in the U.S. M-39 machine gun, and which are also shown, for example, in U.S. Pat. No. 2,981,023 issued to D.B. Sergay on Apr. 25, 1961. It will be appreciated that the separable chambers have a finite amount of longitudinal freedom of movement. Initially the L-shaped seals permit longitudinal movement of the chambers, but, ultimately, the seals yield into the respective gaps, causing binding. More importantly, erosion rapidly develops in the faces of the gaps, especially the aft gap, as the seals are not fully seated until after gun gas is generated by ignition of the round's propellant.

As a matter of passing interest, it may also be noted that "Belleville" washers are shown as used as chamber seals in firearms having a reciprocating bolt and a stationary chamber in U.S. Pat. No. 3,114,290 issued to E.M. Harvey et al. on Dec. 17, 1963 and U.S. Pat. No. 3,354,780 issued to M. Ramsay on Nov. 28, 1967.

SUMMARY OF THE INVENTION

Accordingly, it is an object of this invention to provide a lightweight, strong seal which is always fully seated, minimizes gap face erosion, permits longitudinal chamber play, and permits the firing of many long bursts of rounds of ammunition.

A feature of this invention is the provision of a lightweight, strong, arched seal with a substantially conical face and a plurality of spring fingers to insure full seating before ignition along the innermost annular junction of the seal with the chamber.

BRIEF DESCRIPTION OF THE DRAWING

These and other objects, features and advantages of the invention will be apparent from the following specification thereof taken in conjunction with the accompanying drawing in which.

DESCRIPTION OF THE PREFERRED EMBODIMENT

Figure 1:
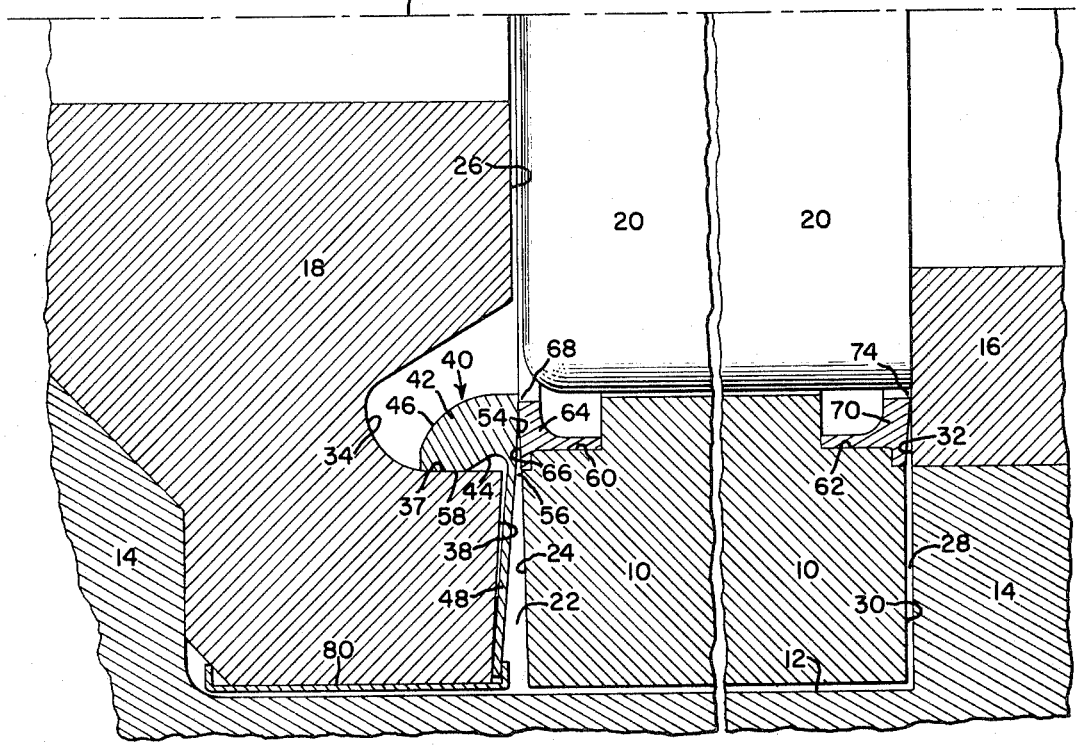
FIG. 1 is a partial view in longitudinal cross-section of a breech, separable chamber and barrel, of a Gatling type gun, similar to that shown in FIG. 3 of U.S. Ser. No 18,099, supra; but showing an arched, spring fingered seal embodying this invention
Figure 2:
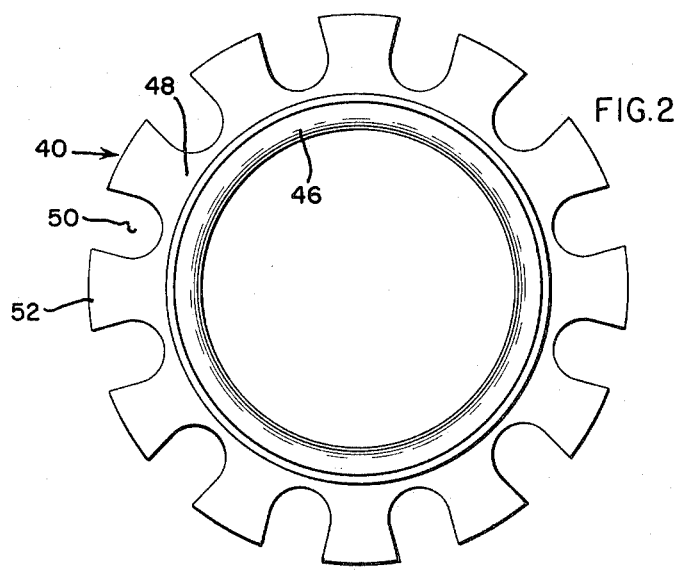
FIG. 2 is a transverse view of the arched, spring fingered seal of FIG. 1.

This invention has broad utility, especially in firearms having transverse relative motion between the chamber and the breech face. For a more complete overall description of a firearm especially adapted to utilize this invention reference may be had to Ser. No. 18,099, supra.

Briefly, a pluraltiy of separable chambers 10, coupled in an elongated, endless chain, circulate through an annular channel 12 formed in a rotor 14. A plurality of gun barrels 16 are secured in an annular row in the rotor forward of an opening into the annular channel 12; and a like plurality of firing pin housings 18 are secured in an annular row in the rotor aft of and facing into the annular channel 12. At the firing station, a chamber is longitudinally aligned with one gun barrel and one firing pin housing. At the loading station, a chamber is transversely spaced from the annular rows of gun barrels and firing pin housings so that a round of caseless ammunition 20 may be longitudinally, forwardly, inserted into the chamber. An aft gap 22 is provided between the aft face 24 of the chamber and the forward face 30 of the chamber and the aft face 32 of the gun barrel. These gaps are provided to permit free relative movement between the chain of chambers and the rotor.

When a chamber is at the firing station, it is necessary to seal the face and aft gaps to avoid decrease of the gas impulse and erosion of the gap faces. In the embodiment shown in FIG. 1, a transverse annular groove 34 is cut longitudinally into the forward face 26 of the firing pin housing 18, coaxial with the center-line 36 of the firing station to provide a cylindrical seal bearing surface 37; and the face of the housing centrifugal of the groove, at 38, is chamferred to increase the gap 22.

A seal 40 is mounted onto the front face of the housing, coaxial with the firing station center line. The seal has an annular portion 42 with an arched, longitudinal cross-section, i.e., the inner surface 46 is convex and the outer surface 44 is concave; and an outer annular portion 48 with a thin cross-section with radial castellated cut-outs 50 to provide a plurality of spring fingers 52. The transverse, forward face 54 of the arch portion 42 is slightly conical, that is, has a rake angle of, for example, 1°, and the outer annular portion is bent back even farther from a crease line 56, for example, 12° from the transverse plane. The longitudinal surface 58 of the arch portion is parallel to the center line 36.

An aft annular stepped groove 60 is cut into the aft face 24 of the chamber 10 and a forward annular stepped groove 62 is cut into the forward face 30 of the chamber.

A seal 64 having a T-shaped cross-section is fixed into the aft groove, 60 and has a transverse aft face 66, providing a seal-bearing surface, projecting aft to beyond the face 24 of the chamber At the firing station, the longitudinally aft, diametrically inner corner 68 of the T-seal 64 makes an annular-line contact with face 54 of the arch seal 40, thereby precluding the establishment of an inwardly opening void between the two seal faces which would trap particles. As an alternative to the scheme here shown, the longitudinally forward, diametrically inner corner of the arch-seal 40 may be arranged to make an annular-line contact with the face 66 of the T-seal 64.

A seal 70 having a T-shaped cross-section is fixed into the forward groove 62 and has a substantially transverse face which is slightly conical, that is, has a rake angle of, for example, 1°, and which projects forwardly beyond the face 30 of the chamber. At the firing station, the longitudinally forward, diametrically inner corner 74 of the T-seal makes an annular-line contact with the aft face of the gun barrel 16, thereby precluding the establishment of an inwardly opening void between the two faces which would trap particles.

The resilient fingers 48 of the arch-seal 40 bias the main portion 42 of the seal forwardly and, thereby, at the firing station, the chamber 10. Thus the seals are pre-seated and the potential voids are closed before the round is ignited and gun gas is generated in the chamber.

Adequate diametrical clearance of the seals should be provided to prevent the seal from binding in the firing pin housing due to thermal expansion. This binding prevents longitudinal movement of the seal and thereby precludes presealing action provided by the spring fingers.

The conical seal contacts the mating surface at the inside edge of the face taper until a predetermined pressure is reached, at which point the entire surface is in contact to distribute the pressure evenly over the entire seal surface.

An annular C-slip 80 is provided to retain the outermost portions of the arch-spring fingers 48 to the firing pin housing 18. This is desirable in the gun shown in Ser. No. 18,099 supra, as the chamber is transversely clear of the arch-seal when it is at the loading station and then moves transversely relative to the arch-seal into longitudinal alignment therewith at the firing station.

It will be appreciated, that as an alternative to the scheme, here shown, the arch seal may be longitudinally reversed and be disposed in an appropriate groove formed into the aft face of the chamber.

Crack initiating, high local stresses in the axial-radial plane of the main portion of the arch-seal are avoided by the arch cross-section which provides a relatively uniform compressive stress field throughout the structure. Although the hoop forces in the tangential direction are tensile, they will not exceed those produced in the supporting chamber. The arch shape also produces substantially uniform reaction forces at the firing pin housing and chamber seating surfaces. This provides positive sealing even in regions of local surface imperfections, so long as cuts or scratches do not extend for the full width of the seating surface which is provided when the arch distorts under the gas impulse to close the gap provided by the rake angle.

What is claimed is:

1. A seal having a longitudinal axis and comprising:

an annular main body portion having a longitudinal cross-section of an arch shape with a convex inner surface proximate to said longitudinal axis, a concave outer surface remote from said longitudinal axis, a peripheral seal-bearing surface substantially coaxial with said longitudinal axis, and a substantially transverse seal-bearing surface substantially normal to said longitudinal axis; and a resilient portion adapted to be deflected and to provide a bias in a direction parallel to said longitudinal axis.

2. A seal according to claim 1, wherein:
said resilient portion is formed substantially as a disk transversely, having a thin web in longitudinal cross-section, and whose transverse distal portion is bent away from the normal to said longitudinal axis to provide a substantially conical rim.

3. A seal according to claim 2, wherein:
said distal portion is castellated to provide a plurality of radial spring fingers.

4. A seal according to claim 1 wherein:
said substantially transverse seal-bearing surface of said main body portion is formed as an annulus of a cone.

5. A seal comprising:
an annular main body portion having a longitudinal central axis and having a longitudinal cross-section of an arch shape with
a convex inner surface proximal to said longitudinal axis,
a concave outer surface remote from said longitudinal axis,
a first, peripheral, seal-bearing surface substantially coaxial with said longitudinal axis,
a second substantially transverse seal-bearing surface substantially normal to said longitudinal axis, and a resilient portion formed substantially as a disk transversely, having a thin web in longitudinal cross-section, and whose transverse distal portion is bent away from the normal to said longitudinal axis to provide a substantially conical rim, and which distal portion is castellated to provide a plurality of radial spring fingers.

6. A seal comprising:
an annular main body portion having a longitudinal central axis and having a longitudinal cross-section of an arch shape with
a convex inner surface proximal to said longitudinal axis,
a concave outer surface remote from said longitudinal axis,
a first, peripheral, seal-bearing surface substantially coaxial with said longitudinal axis,
a second substantially transverse seal-bearing surface substantially normal to said longitudinal axis, and a resilient portion including a distal portion which is castellated to provide a plurality of radial spring fingers.

7. A seal comprising:
an annular main body portion coaxial to said longitudinal central axis and having a longitudinal cross-section of an arch shape with
a convex inner surface proximal to said longitudinal axis,
a first, peripheral, seal-bearing surface substantially coaxial with said longitudinal axis,
a second substantially transverse seal-bearing surface substantially normal to said longitudinal axis, and a resilient portion formed substantially as a disk transversely, having a thin web in longitudinal cross-section, and whose transverse distal portion is bent away from the normal to said longitudinal axis to provide a substantially conical rim, said distal portion being castellated to provide a plurality of radial spring fingers.

8. A seal for a chamber and breech assembly for a firearm, comprising a chamber having a bore adapted to receive a round of ammunition, and having a longitudinally central axis, and an aft transverse face; a breech having a forward transverse face proximal to said chamber aft transverse face and longitudinally spaced therefrom to define an aft gap; a first, cylindrical, seal-bearing surface, coaxial to said longitudinal central axis, formed onto one of the group consisting of said chamber and said breech; a second, transverse, annular, seal bearing surface, coaxial to said longitudinal central axis, formed onto the other of said group consisting of said chamber and said breech;

said seal comprising:
an annular main body portion coaxial to said longitudinal central axis and having a longitudinal cross-section of an arch shape with
a convex inner surface proximal to said longitudinal axis and exposed to said bore of said chamber,
a concave outer surface remote from said longitudinal axis,
a first, peripheral, seal-bearing surface substantially coaxial with said longitudinal axis and disposed adjacent to and adapted to bear on said first cylindrical surface of said group,
a second substantially transverse seal-bearing surface substantially normal to said longitudinal axis and disposed adjacent to and adapted to bear on said second transverse surface of said group, and a resilient portion adapted to be compressed between the two members of said group to bias said seal second, transverse surface against said group second transverse surface,
said resilient portion being formed substantially as a disk transversely, having a thin web in longitudinal cross-section, and whose transverse distal portion is bent away from the normal to said longitudinal axis to provide a substantially conical rim which is disposed within said aft gap and which distal portion is castellated to provide a plurality of radial spring fingers.

9. A seal for a chamber and breech assembly for a firearm, comprising: a chamber having a bore adapted to receive a round of ammunition, and having a longitudinally central axis, and an aft transverse face; a breech, having a forward transverse face proximal to said chamber aft transverse face and longitudinally spaced therefrom to define an aft gap; a first cylindrical seal-bearing surface, coaxial to said longitudinal central axis, formed onto one of the group consisting of said chamber and said breech; a second, transverse, annular, seal-bearing surface, coaxial to said longitudinal central axis, formed onto the other of said consisting of said chamber and said breech;

said seal, comprising:
an annular main body portion coaxial to said longitudinal central axis and having a longitudinal cross-section of an arch shape with
a convex inner surface proximal to said longitudinal axis and exposed to said bore of said chamber,
a concave outer surface remote from said longitudinal axis,
a first, peripheral, seal-bearing surface substantially coaxial with said longitudinal axis and disposed adjacent to and adapted to bear on said first, cylindrical surface of said group,
a second substantially transverse seal-bearing surface substantially normal to said longitudinal axis and disposed adjacent to and adapted to bear on said second, transverse surface of said group, and a resilient portion adapted to be compressed between the two members of said group to bias said seal second, transverse surface against said group second transverse surface;
one of said group consisting of said seal second transverse surface and said chamber-breech group second treanverse surface being formed as an annulus of a cone, whereby, under the bias of said seal resilient portion, the junction of said two transverse surfaces is initially a line contact and is proximal to said longitudinal axis, and any void defined by said two transverse surfaces opens centrifugally and is closed by said junction from said chamber bore.

10. A seal for a chamber and breech assembly for a firearm, comprising: a chamber having a bore, adapted to receive a round of ammunition, and having a longitudinally central axis, and an aft transverse face; a breech having a forward transverse face proximal to said chamber aft transverse face and longitudinally spaced therefrom to define an aft gap; a first cylindrical, seal-bearing surface, coaxial to said longitudinal central axis, formed onto one of the group consisting of said chamber and said breech; a second, transverse, annular, seal-bearing surface, coaxial to said longitudinal central axis, formed onto the other of said group consisting of said chamber and said breech;

said seal, comprising:
an annular main body portion coaxial to said longitudinal central axis and having a longitudinal cross-section of an arch shape with
a convex inner surface proximal to said longitudinal axis and exposed to said bore of said chamber,
a concave outer surface remote from said longitudinal axis,
a first, peripheral, seal-bearing surface substantially coaxial with said longitudinal axis and disposed adjacent to and adapted to bear on said first, cylindrical surface of said group,
a second substantially transverse seal-bearing surface substantially normal to said longitudinal axis and disposed adjacent to and adapted to bear on said second, transverse surface of said group, and a resilient portion adapted to be compressed between the two members of said group to bias said seal second, transverse surface against said group second transverse surface, including a distal portion which is castellated to provide a plurality of radial spring fingers.

11. A seal for a chamber and breech assembly for a firearm, comprising: a chamber having a bore adapted to receive a round of ammunition, and having a longitudinally central axis, and an aft transverse face; a breech, having a forward transverse face proximal to said chamber aft transverse face and longitudinally spaced therefrom to define an aft gap; a first, cylindrical, seal-bearing surface, coaxial to said longitudinal central axis, formed onto one of the group consisting of said chamber and said breech; a second, transverse, annular, seal bearing surface, coaxial to said longitudinal central axis, formed onto the other of said group consisting of said chamber and said breech;

said seal comprising:

an annular main body portion coaxial to said longitudinal central axis and having a longitudinal cross-section of an arch shape with a convex inner surface proximal to said longitudinal axis, and exposed to said bore of said chamber, a first, peripheral, seal-bearing surface substantially coaxial with said longitudinal axis and disposed adjacent to and adapted to bear on said first, cylindrical surface of said group, a second substantially transverse seal-bearing surface substantially normal to said longitudinal axis and disposed adjacent to and adapted to bear on said second, transverse surface of said group, and a resilient portion adapted to be compressed between the two members of said group to bias said seal second, transverse surface against said group second transverse surface;

said seal resilient portion being formed substantially as a disk transversely, having a thin web in longitudinal cross-section, and whose transverse distal portion is bent away from the normal to said longitudinal axis to provide a substantially conical rim, said distal portion being castellated to provide a plurality of radial spring fingers.

12. A seal for a chamber, breech and barrel assembly for a firearm, comprising a chamber having a bore, adapted to receive a round of ammunition, and having a longitudinal central axis, an aft transverse face, and a forward transverse face; a breech, having a forward transverse face proximal to said chamber aft face and longitudinally spaced therefrom to define an aft gap; a first cylindrical, seal bearing surface, coaxial to said longitudinal central axis, formed onto one of the group consisting of said chamber and said breech; a second, transverse, annular, seal bearing surface, coaxial to said longitudinal central axis, formed onto the other of said breech-chamber group; a barrel, having an aft transverse face proximal to said chamber forward face and spaced therefrom to define a forward gap; a third, transverse, annular, seal-bearing surface, coaxial to said longitudinal central axis, formed onto one of the group consisting of said chamber and said barrel, formed as an annulus of a cone; a fourth transverse, annular, seal-bearing surface, coaxial to said longitudinal central axis, formed onto the other of said chamber-barrel group;

said seal comprising:

an annular main body portion, coaxial to said longitudinal central axis, and having a longitudinal cross-section of an arch shape with a convex inner surface proximal to said longitudinal axis and exposed to said bore of said chamber, a concave outer surface remote from said longitudinal surface, a first, peripheral, seal-bearing surface substantially coaxial with said longitudinal axis and disposed adjacent to and adapted to bear on said first, cylindrical surface of said chamber-breech group, a second substantially transverse seal-bearing surface substantially normal to said longitudinal axis and disposed adjacent to and adapted to bear on said second surface of said chamber-breech group, and a resilient portion adapted to be compressed between said breech and said chamber to bias said seal second, transverse surface against said chamber-breech group second transverse surface and to bias said third and fourth surfaces of said chamber-barrel group together; one of said group consisting of said seal second transverse surface and said chamber breech group second transverse surface being formed as an annulus of a cone, whereby, under the bias of said seal resilient portion, the junction of said two transverse surfaces is initially a line contact and is proximal to said longitudinal axis, and any void defined by said two transverse surface opens centrifugally and is closed by said junction from said chamber bore.

* * * * *